Dec. 29, 1953

F. N. GILLETTE

TELEVISION RECORDER 2,664,465

Filed April 18, 1950

3 Sheets-Sheet 1

INVENTOR.
FRANK N. GILLETTE
BY H. S. Mackey
ATTORNEY

Dec. 29, 1953

F. N. GILLETTE 2,664,465

TELEVISION RECORDER

Filed April 18, 1950

3 Sheets-Sheet 2

INVENTOR.
FRANK N. GILLETTE
BY H. S. Mackey
ATTORNEY

Dec. 29, 1953 F. N. GILLETTE 2,664,465

TELEVISION RECORDER

Filed April 18, 1950 3 Sheets-Sheet 3

INVENTOR.
FRANK N. GILLETTE
BY H. S. Mackey
ATTORNEY

Patented Dec. 29, 1953

2,664,465

UNITED STATES PATENT OFFICE 2,664,465

TELEVISION RECORDER

Frank N. Gillette, Pleasantville, N. Y., assignor to General Precision Laboratory Incorporated, a corporation of New York Application April 18, 1950, Serial No. 156,553

15 Claims. (Cl. 178—7.4)

Figure 1:
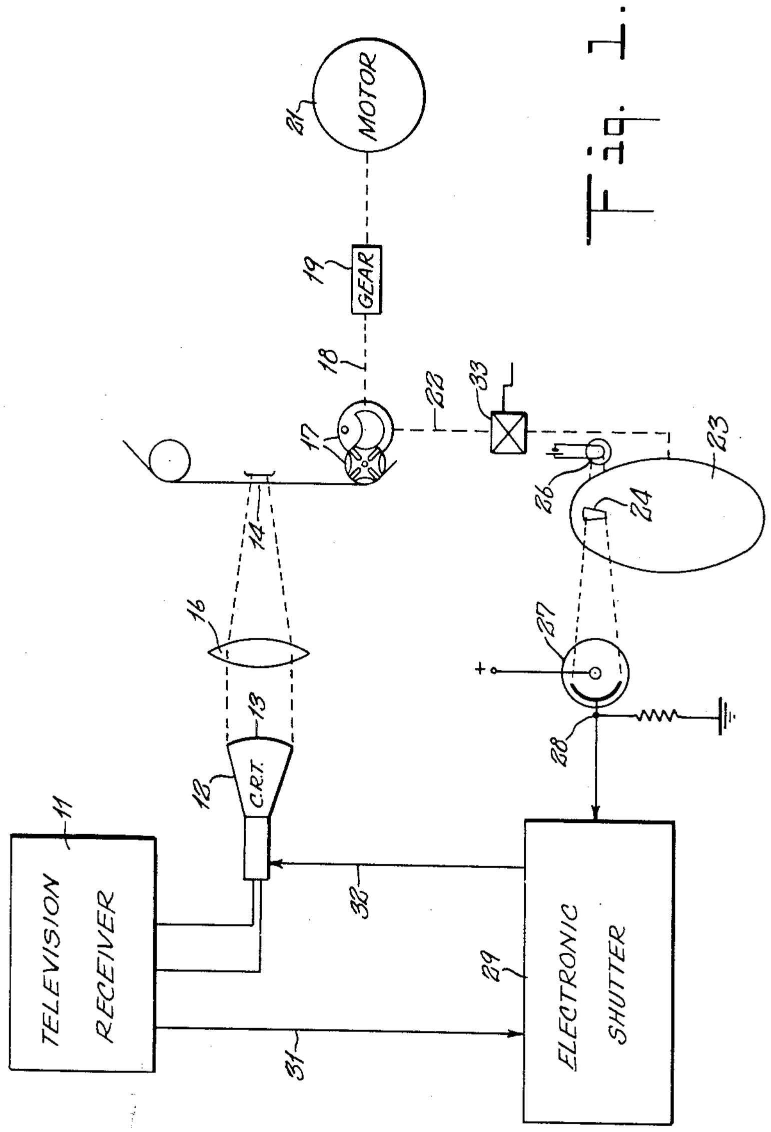

This invention pertains to a television recorder and more particularly to means for recording received television pictures on motion picture film for projection by standard motion picture projectors.

The mechanism of this invention includes a motion picture camera for photographing the picture on a television picture or cathode ray tube. Since the resulting film is to be projected in a standard projector the camera must be equipped with standard intermittent mechanism advancing the film at 24 frames per second, the film being exposed only while stationary. An electronic shutter is provided to permit illumination of the picture tube only during part of these stationary periods. Phasing and synchronization between the electronic shutter and the intermittent are required, and in the instant invention are controlled by the intermittent.

Television pictures are delineated upon the picture tube screen by a cathode ray beam within the tube that scans or draws the picture, one horizontal line at a time, until the entire picture has been produced. This according to present practice requires 525 lines. After one picture is completed the second is immediately started. The present invention is described in an embodiment based upon a 525-line picture, but it will be apparent that the invention is not restricted to such a picture, but is applicable to a picture of any number of lines.

The mechanism of the present invention exposes each frame of the film for a length of time equal to the period of one television picture of 525 lines. It is necessary for this relation to be exact: if any lines or even part of a line be omitted, that film frame will at that spot be unexposed; if any line or portion be shown twice, that portion of the film will be doubly exposed and therefore overexposed as well as possibly blurred.

Previous methods of synchronization and phasing between camera and shutter to secure this exactness of exposure have included use of a mechanical shutter controlled by the camera mechanism. This made very difficult the limiting of the exposure time to exactly 525 lines, and has not been satisfactory for that reason.

The apparatus of the present invention employs an electronic shutter started by the camera intermittent mechanism and stopped by the television equipment itself after a time corresponding exactly to 525 television horizontal lines. The apparatus thus inherently synchronizes the tube illumination with the camera operation, and limits each frame exposure time to exactly that of 525 lines.

The equipment described hereinafter for starting the shutter employs a light and phototube for generating optically an electric signal representative of the speed and phase of the intermittent. However, it is obvious to those skilled in the art that other methods can easily be devised for initiating the exposure periods, and any such method may be employed in place of that described.

Other means for starting the shutter are described in copending application Serial No. 54,042, filed on October 12, 1948, of Gillette et al., of which the instant invention is an improvement.

The provision of a method and apparatus for proper synchronization and phasing of the shutter under control of the camera and for proper coordination of the duration of shutter opening with the timing of the television equipment are purposes of this invention.

The provision of a method and apparatus for exposing the camera film for periods each equal in time to the duration of one television picture is another purpose of this invention.

The provision of a method and apparatus having improved accuracy of exposure time is still another purpose of this invention.

This invention will be more readily understood from the following detailed description, considered together with the attached drawings in which:

Figure 1 illustrates the general arrangement of equipment of the television recording apparatus.

Figure 2:
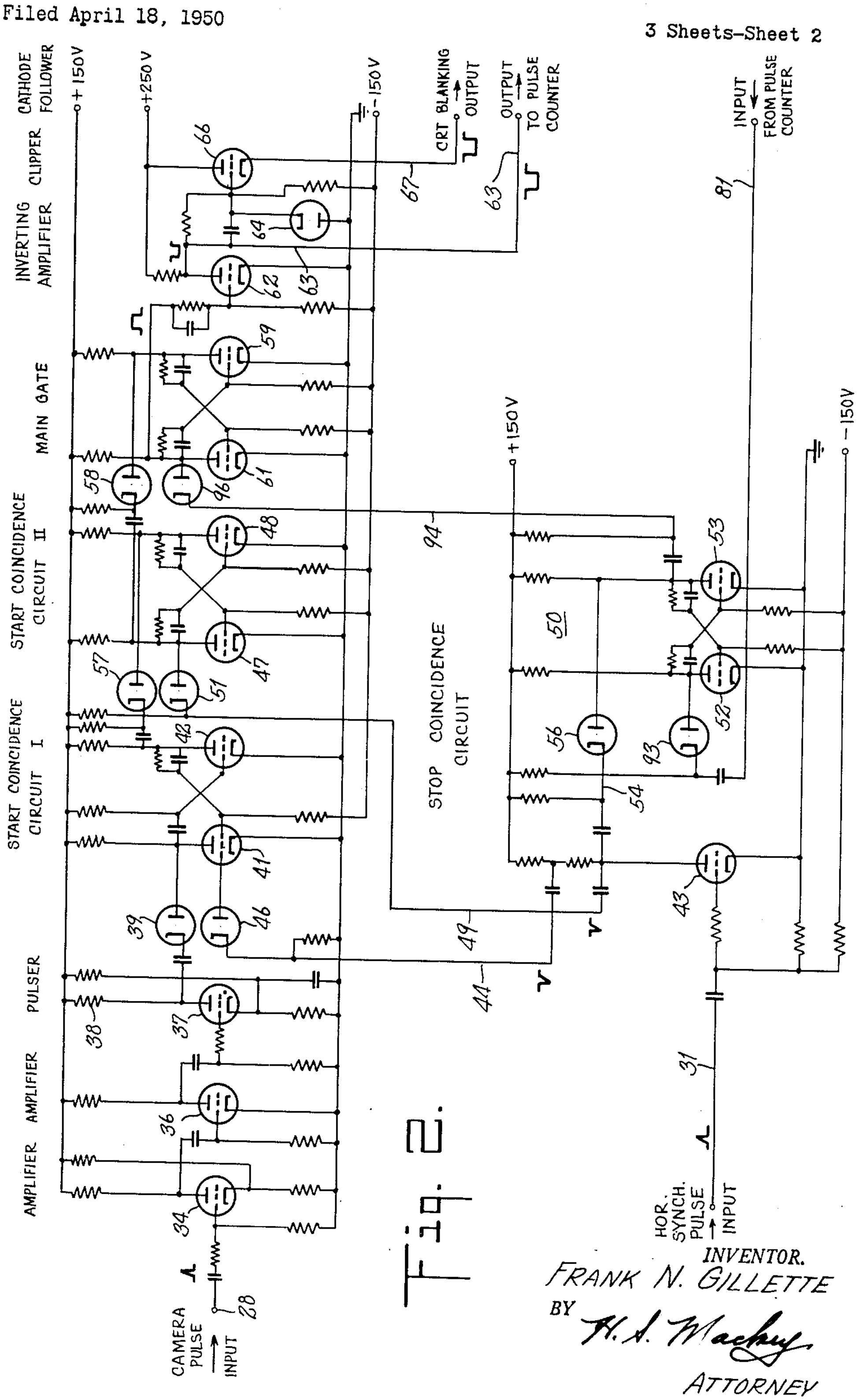

Figure 2 schematically illustrates the gating circuit.

Figure 3:
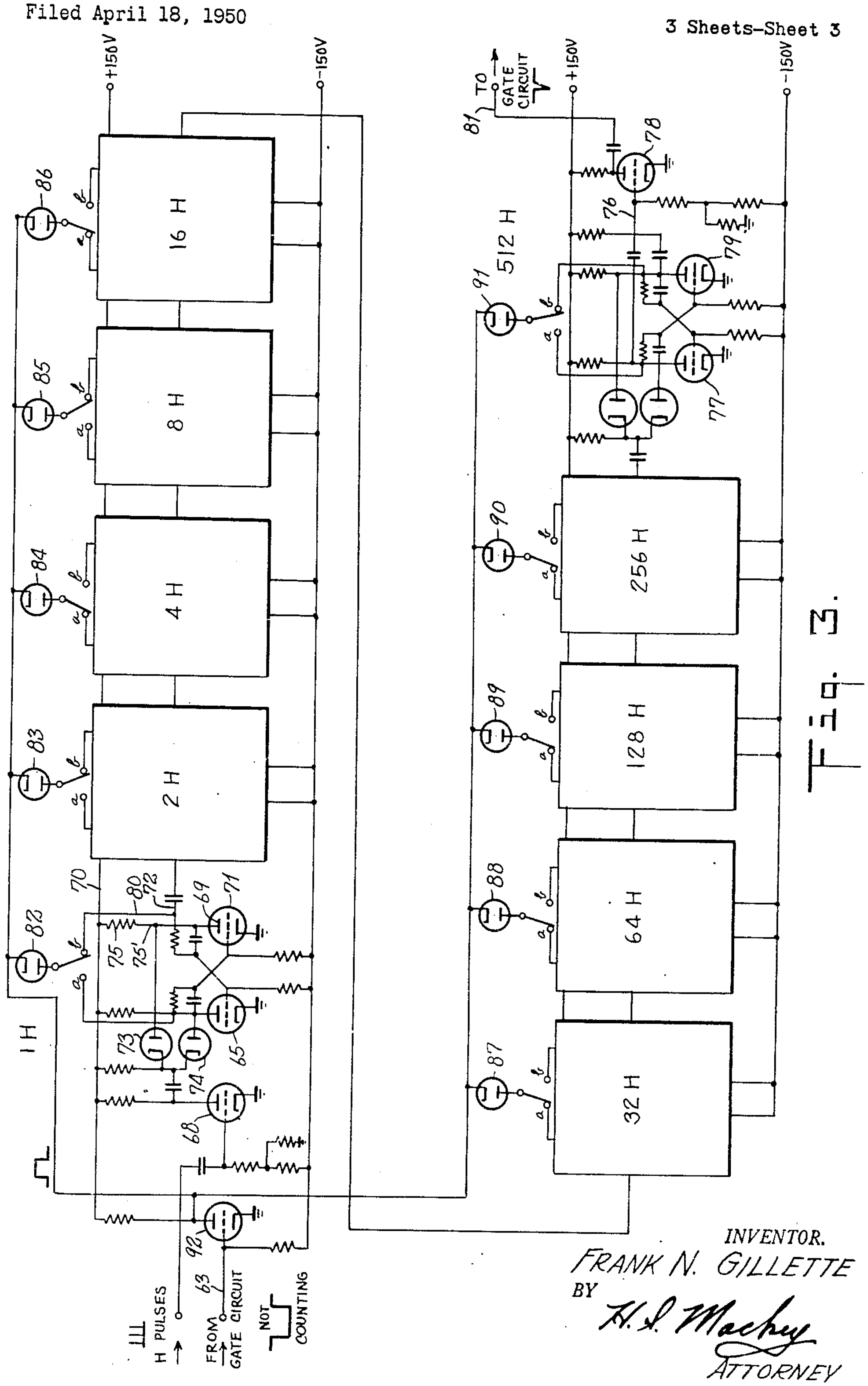

Figure 3 schematically illustrates the pulse counting circuit.

Referring now to Fig. 1, a television receiver 11 and its associated cathode ray tube 12 are positioned for projection of the television picture appearing on the screen 13 of the tube onto a sensitized motion picture film 14 by means of an optical system schematically represented by a lens 16. The film 14 is intermittently advanced by an intermittent mechanism 17, as in a motion picture camera. The intermittent 17 is actuated through a shaft 18 and gearing 19 by a motor 21. On an extension or portion 22 of the shaft 18 there is placed a disc 23 having an aperture 24, the rotation of the disc 23 being at the rate of one revolution for each advancement of the film. Behind the disc 23 there is placed a lamp 26 and in front of the disc is a phototube 27, so that when the aperture is aligned with the lamp and phototube the latter is illuminated by the light of the lamp and the resistance of the phototube momentarily falls. This produces at the cathode terminal 28 a momentary positive voltage pulse.

An electronic shutter 29 is connected for actuation by these phototube pulses and also for actuation by horizontal synchronizing pulses conducted to it from the television receiver 11 through a conductor 31. The function of the electronic shutter is to control the times of starting and of termination of the illumination of cathode ray tube 12, which it does through circuit connections indicated by the line 32.

The function of the camera pulses generated at the terminal 28 by the light shining through the disc aperture 24 is, through the electronic shutter 29, to initiate each period of illumination of the cathode ray tube 12. The shutter 29 thereupon counts 525 horizontal synchronizing pulses, then turns off the cathode ray tube illumination. The ensuing dark period continues while the intermittent 17 advances the motion picture film 14 by one frame. Shortly thereafter another light pulse triggers the electronic shutter 29 and the cycle is repeated.

The exact synchronism of the electronic shutter with the intermittent is secured by the enslavement of the former to the pulses initiated by the latter. The phase of the cathode ray tube shuttering relative to the camera pull-down is determined by the angular position of the aperture 24, which can easily be made optimum by design or, by the use of a mechanical differential 33 in the shaft 22, the phase can be adjusted during operation. The illumination of the cathode ray tube screen 13 for exactly 525 horizontal line periods results in the exhibition on the screen 13 of successive whole television pictures, the position in the raster of the start of an illumination period being immaterial. Accuracy is enhanced by the incorporation in the electronic shutter of a pulse counter of such design as to have an operation time of a very low value, of the order of one microsecond. The manner by which this is accomplished will be apparent in the following detailed description of the electronic shutter 29.

In Fig. 2, positive camera pulses from the phototube cathode terminal 28 are applied to amplifier tubes 34 and 36, and the resulting amplified and sharpened pulse is applied to a pulsing thyratron 37, which emits from its anode a strong negative pulse which is quickly extinguished because of the high resistance of the anode resistor 38. The pulse so produced is applied through a trigger diode 39 to the grid of the right tube 42 of a monostable multivibrator comprising tubes 41 and 42, which is termed the first starting coincidence circuit. In this circuit the tube 42 is normally conductive, and the time period of the circuit is long compared to one horizontal pulse period of 63 μs. When the negative camera pulse is applied to this circuit it renders the tube 42 nonconductive and the tube 41 conductive.

Horizontal synchronizing positive pulses are applied continuously through conductor 31 to an inverting amplifier triode 43, which sharpens them and applies them as negative pulses through conductor 44 and a trigger diode 46 to the grid of tube 41 of the first starting coincidence circuit. The first of these continuously applied horizontal pulses occurring after the camera pulse therefore causes tube 42 again to conduct.

A second starting coincidence circuit consists of a bistable multivibrator comprising tubes 47 and 48. Amplifier horizontal synchronizing pulses are continuously applied through conductor 49 and a trigger diode 51 to the grid of tube 48, which renders this tube normally nonconductive and tube 47 normally conductive.

A stopping coincidence circuit 50 consists of a bistable multivibrator comprising tubes 52 and 53. Amplified horizontal synchronizing pulses are also continuously applied through conductor 54 and trigger diode 56 to this circuit, in such fashion that tube 53 is normally conductive.

Returning now to the first starting coincidence circuit comprised of tubes 41 and 42, the restarting of conductance in tube 42 caused by the first horizontal pulse after the camera pulse generates a negative voltage step at the anode which is applied through trigger diode 57 to the grid of tube 47, making it nonconductive. The grid of tube 48 is, however, continuously subject to the repeated horizontal synchronizing pulses, so that the first such pulse thereafter returns this circuit to the condition in which tube 47 is conductive. The pulse which effects this is termed the 0th pulse. This restarting of tube 47 produces a negative voltage step at its anode which, through trigger diode 58 makes the tube 59 conductive, tube 59 together with tube 61 comprising a bistable circuit termed the main gate multivibrator.

While the system of the invention is operative when only a single starting coincidence circuit is used it is found to be preferable to utilize the second starting coincidence circuit to insure absolute and positive action at all times. It will be apparent that inasmuch as the camera pulse may occur at any time, the horizontal synchronizing pulse occurring thereafter which acts to switch this circuit and to produce a negative output pulse may occur so soon after the production of the camera pulse that the amplitude conditions of the starting coincidence circuit have not become stabilized. This may result in the production of a low amplitude output pulse which would imperfectly actuate the main gate multivibrator. When, however, the second starting coincidence circuit is utilized even at the expense of some additional elements, the time between switching conditions must be that interval between horizontal synchronizing pulses, namely 63 μs. Thus this circuit is always permitted to attain its stabilized condition before being actuated to produce an output pulse insuring that the pulse so produced will be of a definite amplitude which will positively and accurately operate the main gate multivibrator.

When tube 59 becomes conductive and tube 61 nonconductive a positive voltage step is produced at the anode of tube 61. This voltage step is amplified, shaped and inverted in the circuit of tube 62, appearing on conductor 63 as a rectangular negative voltage step, is negatively limited by diode 64 and transmitted through a cathode follower tube 66 and conductor 67 to the cathode circuit of the cathode ray tube 12, Fig. 1, with the result that the illumination of the screen of this tube is initiated, and is maintained for the duration of the voltage step. The termination of the step is timed by another circuit termed the pulse counter, described as follows.

The pulse counter circuit, Fig. 3, comprises ten similar bistable multivibrator circuits. These circuits are identical except for the necessary connections to apply signals to the first circuit and to secure signals from the last one. The ten circuits are arranged in cascade, so that each is actuated by the next preceding circuit and in turn actuates the next succeeding circuit. Triggering of each circuit is accomplished by two diodes connected respectively to the two grids of each circuit, the diodes having their polarities arranged to accept only negative pulses. One input signal consists of positive horizontal synchronizing or H pulses, which are inverted, amplified, and sharpened by an amplifier tube 68 and are applied to both trigger diodes of the first circuit or stage, with the result that this stage continuously changes from one stable state to the other and back, making one change for each H pulse received. The output connection from this stage to the next or second stage is from the anode 69 of tube 71 through a conductor 72, and consists of a positive voltage step when the tube 71 becomes nonconductive and of a negative voltage step when it becomes conductive. Since the connection to the second stage is through diodes similar to diodes 73 and 74 of the first stage which accept negative pulses only, only every other pulse from stage 1 actuates stage 2. Similarly each other stage is actuated only by the alternate negative output pulses of the preceding stage.

The ten stages are designated by the numbers 1H, 2H, 4H, etc. to 512H for the last stage, in geometric series, each character thus representing the number of incoming H pulses which must be impressed on the entire circuit before an output pulse is produced by that particular stage. Since the output pulses of each stage are alternately positive and negative, the number of input pulses to cause a negative output pulse is twice the value of the numeral in the designating character.

Each stage is connected to the next succeeding stage by a connection from the right-hand tube anode, as illustrated in Fig. 3, so that when the left tube is conductive, the next operation produces a negative output pulse, but if the right tube is conductive, the next operation produces only a positive pulse which is barred from passage by the trigger diodes of the following stage. The final stage, 512H, is arranged for similar polarity of output by a connection 76 from the anode of its left tube 77 to an inverting amplifier 78, so that operation of the left tube 77 to its nonconductive condition causes a negative output pulse in the output conductor 81. This conductor applies a pulse to the gate circuit of Fig. 2 at such a time as to permit the 525th horizontal pulse applied thereto to terminate the cathode ray tube illumination. The pulse counter is caused to count the desired number of horizontal pulses by the following means.

In Fig. 3 each stage contains a locking diode 82—91 having its anode connected to the pole of a double throw switch whose two contacts *a* and *b*, are connected to the anodes of the left and right multivibrator tubes respectively. These switches are shown connected in positions to give a pulse count of 524, which is required in order that the entire electronic shutter shall count 525 horizontal pulse intervals. These switches could therefore be replaced by through connections as indicated for this embodiment, but switches are employed to indicate the applicability of the circuit for counting any number between 1 and 1024. All of the cathodes of the ten locking diodes are connected in shunt to the anode of an input amplifier tube 92, the grid of which is energized through conductor 63 from the gate circuit (Fig. 2). This energization consists of a potential which may be either of two selected values being the lower of such values during the occurrence of the negative step or gate which persists for the duration of the cathode ray tube illumination. This gate is inverted by tube 92 to become a positive gate or rectangular pulse of long duration applied to the locking diode cathodes. The voltage magnitudes of this latter gate are a positive voltage about equal to the multivibrator anode supply, and a positive voltage which is more positive than the anode potential of a multivibrator section when that section is conductive but less positive than the potential which if applied to the anode of one of the sections of the multivibrator would maintain that section nonconductive. Therefore, the more positive voltage holds all locking diodes 82—91 nonconductive and effectively open circuited so that they have no effect on the circuit.

The less positive voltage, however, which occurs during the interval between counting periods renders the diodes 82—91 conductive and these diodes when thus rendered conductive have the effect of resetting and locking the various multivibrator stages in a particular operative condition which cannot be altered by the reception of incoming H pulses so long as the diodes remain conductive.

Under such conditions when a selected switch is in position *a* the left tube of a particular multivibrator is rendered conductive while when a selected switch is in position *b* the right hand tube of a particular multivibrator stage is rendered conductive. For example considering stage 1H and assuming the switch to be in position *b* as shown and the diode 82 in conductive condition current will flow from the anode supply lead 70, through resistor 75, conductor 80 and diode 82 which therefore acts as a current drain to maintain the potential of the anode 69 of the tube 71 at a reduced potential as a result of the potential drop produced by the diode drain current flowing through resistor 75. If now a negative pulse should be impressed on this stage by the reception of an H pulse no change in the operative condition of this stage can occur since the only effect of this pulse would be to tend to drive the grid of the tube 71 negative reducing the current flow in this tube which through the usual multivibrator interconnections would tend to drive the grid of the tube 65 positive resulting in the tube 65 being rendered conductive. However, since the current drain flowing through resistor 75 maintains the terminal 75' at a reduced potential regardless of the momentary tendency for the tube 71 to be reduced in current flow, the grid of the tube 65 is maintained at a negative potential. The tube 65 cannot, therefore, become conductive and the usual multivibrator change in conductive states does not result.

As will be readily apparent when the switch is in the *a* position, the tube 65 is maintained conductive while the tube 71 is maintained nonconductive regardless of the imposition thereof of H pulses.

This locking of the various multivibrator stages in one or the other condition of operation takes place during the time that the screen of the cathode ray tube is blanked and when the voltage wave is applied to the cathode of the cathode ray tube such as to permit illumination of the screen the diodes 82—91 are rendered inoperative so that at the start of the illumination period the multivibrator stages are in one or the other state of operation and are in condition whereby the imposition of negative pulses on any particular stage will cause it to change to its other state.

Whether the first or second negative pulse applied to any particular stage will result in the production of an output pulse of the proper polarity to effect a change in the operative condition of the next succeeding stage depends on which tube of the particular stage was originally conductive and hence on the position of the switch of that particular stage.

For example let it be assumed that the left hand tube of a particular stage was originally conductive. The first negative pulse impressed thereon will reverse this condition and the right hand tube will then become conductive and since the output is derived from the anode of the right hand tube a negative pulse will be immediately produced which will effect operation of the next succeeding stage. On the other hand if the left hand tube is originally in a nonconductive state the imposition of a negative pulse on this stage will reverse this condition rendering the right hand tube nonconductive which in turn results in the production of a positive output pulse which cannot be impressed on the next succeeding stage, being blocked by the triggering diodes. When the next negative pulse is impressed on the stage, however, a negative output pulse is produced in the manner as first described and hence under these circumstances it is the second negative input pulse which acts to operate the next succeeding stage.

Under these circumstances it will be apparent that if the switches of all stages are in position *a*, the first pulse impressed on the circuit will be immediately relayed to the output stage producing an output pulse. On the other hand if all switches are in position *b* an output pulse will not be emitted by the tenth or 512H stage until the 1024th input pulse has been impressed on the circuit. Thus by proper actuation of the switches any number of input pulses from 1 to 1024 may be counted in the ten stages.

As a general rule it may be stated that the number of pulses counted, that is, the number of input pulses which must be impressed on the circuit before an output pulse is produced is equal to 1024 minus the sum of the designating numbers of those stages in which the switches are in the *a* position. As depicted in the drawings stages 4H, 16H, 32H, 64H, 128H and 256H have their switches in such position and hence the pulse count is 1024–500 or 524. Thus the circuit emits an output pulse coincident with the 524th input pulse except for the electronic lag occasioned by the circuit parameters which lag is in the order of a few micro-seconds.

Returning now to Fig. 2, the output pulse from the pulse counting circuit is transmitted over conductor 81 and is applied through the trigger diode 93 to the tube 53 of the stopping coincidence multivibrator 50, making tube 52 conductive. The next H pulse applied to conductor 31 will cause the multivibrator 50 to switch to its other state of operation making tube 53 conductive, and in so doing a negative pulse is generated and applied to conductor 94, and hence through a trigger diode 96 to the tube 61 of the main gate multivibrator making tube 61 conductive and terminating the positive gate generated by the main gate multivibrator. This H pulse is the 525th pulse received since the initiation of the positive gate because it immediately followed the preparation of the stopping coincidence circuit by the pulse counter output, which was approximately coincident with the 524th pulse.

Termination of the gate of the main gate multivibrator makes output conductor 67 again more positive, terminating the cathode ray tube illumination. It also makes output conductor 63 more positive, which reapplies locking voltage to all ten locking diodes 82—91 of Fig. 3 resetting the counter circuit stages to the desired states for the beginning of the next 524 count.

The time lag in terminating the cathode ray tube illumination is reduced in this way to a fraction of a microsecond because it depends only on the lag between actuation of the stop coincidence multivibrator by an H pulse and the rise of voltage in conductor 67.

Thus in the apparatus of the instant invention a pulse generated by the camera equipment as soon as the film has been advanced and positioned properly for receiving a photographic image, taken together with the first horizontal synchronizing pulse received thereafter conditions a trigger circuit for operation. The next horizontal synchronizing pulse to be received then operates the trigger circuit to initiate a gate which acts to illuminate the cathode ray tube screen and at the same time unlocks the counter circuit which thereupon accepts and begins to count horizontal synchronizing pulses. After such number of horizontal synchronizing pulses have been counted as would constitute a complete television picture less one, the counting circuit produces an output pulse which conditions another trigger circuit so that the next horizontal synchronizing pulse to be received, and the one which constitutes the completion of the television picture, operates the last mentioned trigger circuit which in turn then generates a pulse which terminates the gate, darkening the cathode ray screen, locking the counter circuit in a desired condition of operation and so placing the apparatus in condition for a new cycle of operation when the next frame of the film strip has been advanced into position.

What is claimed is:

1. An apparatus for recording television images derived from the images displayed on a cathode ray tube screen comprising, a counting circuit having impressed thereon received television horizontal synchronizing signals, said counting circuit counting such number of horizontal synchronizing signals as constitute one less than are incorporated in one complete television picture and producing an output pulse at the termination of such count, means for simultaneously initiating the operation of said counting circuit and initiating the illumination of said cathode ray tube screen, and means operative by said counting circuit output pulse and the horizontal synchronizing signal which next succeeds the generation of said counting circuit output pulse for terminating the illumination of said cathode ray tube screen and the operation of said counter circuit.

2. An apparatus for recording television images derived from the images displayed on a cathode ray tube screen comprising a counting circuit having impressed thereon received television horizontal synchronizing signals, said counting circuit counting such number of horizontal synchronizing signals as constitute one less than are incorporated in one complete television picture and producing an output pulse at the termination of such count, means for simultaneously initiating the operation of said counting circuit and initiating the illumination of said cathode ray tube screen, trigger circuit means having first and second conditions of operation, said first condition rendering said trigger circuit means capable of operation to said second condition and operation to said second condition resulting in the generation of a signal pulse, circuit means for impressing the output pulse on said trigger circuit means and for causing said trigger circuit means to assume its first condition of operation, circuit means for impressing horizontal synchronizing signals on said trigger circuit means and for causing said trigger circuit means to be operated to its second condition of operation after having been caused to assume its first condition of operation by said counting circuit output pulse and means operative by the signal pulse generated by said trigger circuit means terminating the illumination of said cathode ray tube screen and terminating the operation of said counting circuit.

3. An apparatus for recording received television images in which the images displayed on a cathode ray tube screen are projected on a sensitized film strip comprising, a camera including an intermittent mechanism periodically advancing and positioning said film strip, counting circuit means having impressed thereon the received television horizontal synchronizing signals, said counting circuit means counting such number of horizontal synchronizing signals as constitute one less than are incorporated in one complete television picture and producing an output pulse at the termination of such count, means operative subsequent to the advancement of said film strip by said intermittent mechanism for initiating the illumination of said cathode ray tube screen and for simultaneously initiating operation of said counting circuit means, and means operative by the output pulse of said counting circuit means and the horizontal synchronizing signal which immediately succeeds the production of said output pulse for terminating the illumination of said cathode ray tube screen and the operation of said counting circuit means.

4. An aparatus for recording received television images in which the images displayed on a cathode ray tube screen are projected on a sensitized film strip comprising, a camera including an intermittent mechanism periodically advancing and positioning said film strip, counting circuit means having impressed thereon the received television horizontal synchronizing signals, said counting circuit means counting such number of horizontal synchronizing signals as constitute one less than are incorporated in one complete television picture and producing an output pulse at the termination of such count, means operative subsequent to the advancement of said film strip by said intermittent mechanism for initiating the illumination of said cathode ray tube screen and for simultaneously initiating operation of said counting circuit means, a trigger circuit, means for impressing the output pulse of said counting circuit means thereon and for conditioning said trigger circuit for operation thereby, means for impressing horizontal synchronizing signals on said trigger circuit and for operating said trigger circuit after said trigger circuit has been conditioned for operation by said counting circuit means output pulse whereby said trigger circuit generates an output pulse concurrently with the imposition thereon of the first horizontal synchronizing pulse succeeding the generation of the counting circuit means output pulse and means operative by said trigger output pulse terminating the illumination of said cathode ray tube screen and the operation of said counting circuit means.

5. An apparatus for recording received television images in which the images displayed on a cathode ray tube screen are projected on a sensitized film strip comprising, a camera including an intermittent mechanism periodically advancing and positioning said film strip, counting circuit means having impressed thereon the received television horizontal synchronizing signals, said counting circuit means counting such number of horizontal synchronizing signals as constitute one less than are incorporated in one complete television picture and producing an output pulse at the termination of such count, a signal generator operated by said intermittent mechanism producing a signal immediately succeeding the operation of the intermittent mechanism in advancing the film strip, means operative in response to said generated signal and a succeeding horizontal synchronizing signal for initiating the illumination of said cathode ray tube screen and for initiating the operation of said counting circuit means, and means operative by the output pulse of said counting circuit means and the horizontal synchronizing signal which immediately succeeds the production of said output pulse for terminating the illumination of said cathode ray screen and the operation of said counting circuit means.

6. An apparatus for recording received television images in which the images displayed on a cathode ray tube screen are projected on a sensitized film strip comprising, a camera including an intermittent mechanism periodically advancing and positioning said film strip, a counting circuit having impressed thereon received television horizontal synchronizing signals, said counting circuit counting such number of horizontal synchronizing signals as constitute one less than are incorporated in one complete television picture and producing an output pulse at the termination of such count, a signal generator operated by said intermittent mechanism producing a signal immediately succeeding the operation of the intermittent mechanism in advancing the film strip, means operative by the conjoint action of said generated signal and a succeeding horizontal synchronizing signal for initiating the illumination of said cathode ray tube screen and for initiating the operation of said counting circuit, trigger circuit means generating an output pulse on operation thereof, circuit means for impressing the output pulse of said counting circuit on said trigger circuit conditioning said trigger circuit for operation, circuit means for impressing horizontal synchronizing signals on said trigger circuit and for causing operation thereof after said trigger circuit has been conditioned for operation and means operative by said trigger circuit output pulse for terminating the illumination of said cathode ray tube screen and the operation of said counting circuit.

7. An apparatus for recording television images derived from the images displayed on a cathode ray tube screen comprising, a counting circuit including a plurality of multivibrators connected in tandem, each of said multivibrators having two conditions of operation and said multivibrators being interconnected by circuit means such that only a change to one of said two conditions of operation will effect a change in the condition of operation of the next succeeding multivibrator, means associated with each of said multivibrators for locking each said multivibrator in an initial selected condition of operation, means for initiating the illumination of said cathode ray tube screen and unlocking said multivibrators, circuit means impressing horizontal synchronizing signals on said counting circuit, the initial selected condition of operation of each said multivibrator being such that after said multivibrator stages are unlocked such number of horizontal synchronizing signals must be impressed thereon before an output pulse is produced as constitute one less than are incorporated in one complete television picture, and means operative by said counting circuit output pulse and the horizontal synchronizing signal which next succeeds the generation of said counting circuit output pulse for terminating the illumination of said cathode ray screen and for locking said counting circuit multivibrator stages in their selected conditions of operation.

8. An apparatus for recording television images derived from the images displayed on a cathode ray tube screen comprising, a counting circuit including a plurality of multivibrators connected in tandem, each of said multivibrators having two conditions of operation and said multivibrators being interconnected by circuit means such that only a change to one of said two conditions of operation will effect a change in the condition of operation of the next succeeding multivibrator, means associated with each of said multivibrators for locking each said multivibrator in an initial selected condition of operation, means for initiating the illumination of said cathode ray tube screen and simultaneously unlocking said multivibrators, circuit means impressing horizontal synchronizing signals on said counting circuit, the initial selected condition of operation of each said multivibrator being such that after said multivibrator stages are unlocked such number of horizontal synchronizing signals must be impressed thereon before an output pulse is generated as constitute one less than are incorporated in one complete television picture, trigger means having first and second states of operation, operation to said first state conditioning said trigger means for operation to said second state and operation to said second state thereafter resulting in the generation of a signal pulse, circuit means for impressing the output pulse generated by said counting circuit on said trigger means causing said trigger means to assume its first state of operation, circuit means for impressing horizontal synchronizing signals on said trigger means for causing said trigger means to be operated to its second state thereby generating a signal pulse at the time of occurrence of the first horizontal synchronizing pulse next succeeding the generation of said counting circuit output pulse, and means operative by said trigger means signal pulse terminating the illumination of said cathode ray tube screen and for locking said counting circuit multivibrator stages in their selected conditions of operation.

9. An apparatus for recording received television images in which the images displayed on a cathode ray tube screen are projected on a sensitized film strip comprising, a camera including an intermittent mechanism periodically advancing and positioning said film strip, counting circuit means having impressed thereon the received television horizontal synchronizing signals, said counting circuit means counting such number of horizontal synchronizing signals as constitute one less than are incorporated in one complete television picture and producing an output pulse at the termination of such count, a signal generator operated by said intermittent mechanism generating a signal immediately succeeding the operation of said intermittent mechanism in advancing the film strip, a trigger means having first and second states of operation, operation to said first state conditioning said trigger means for operation to its second state and operation to said second state thereafter resulting in the generation of a signal pulse, circuit means impressing the signal generated by said signal generator on said trigger means causing said trigger means to assume its first state of operation, circuit means for impressing horizontal synchronizing signals on said trigger means causing said trigger means to assume its second state of operation, circuit means operative by said trigger means signal pulse initiating illumination of said cathode ray tube screen and simultaneously initiating operation of said counting circuit means, and means operative by the output pulse of said counting circuit means and a horizontal synchronizing signal whose time of occurrence next succeeds the time of generation of counting circuit means output pulse for terminating the illumination of said cathode ray tube screen and the operation of said counting circuit means.

10. An apparatus for recording received television images in which the images displayed on a cathode ray tube screen are projected on a sensitized film strip comprising, a camera including an intermittent mechanism periodically advancing and positioning said film strip, counting circuit means having impressed thereon the received television horizontal synchronizing signals, said counting circuit means counting such number of horizontal synchronizing signals as constitute one less than are incorporated in one complete television picture and producing an output pulse at the termination of such count, a signal generator operated by said intermittent mechanism generating a signal immediately succeeding the operation of said intermittent mechanism in advancing the film strip, a first trigger means having first and second states of operation, operation to said first state acting to condition said trigger means for operation to its second state and operation to its second state thereafter resulting in the generation of a signal pulse, circuit means impressing the signal generator signal on said first trigger means causing said first trigger means to assume its first operative state, circuit means for impressing horizontal synchronizing signals on said first trigger means causing said first trigger means to assume its second operative state, circuit means operative by said first trigger means signal pulse for initiating illumination of said cathode ray tube screen and simultaneously initiating operation of said counting circuit means, a second trigger means having first and second operative states, said first operative state acting to condition said second trigger means for operation to its second state and operation to said second state thereafter resulting in the generation of a signal pulse, circuit means impressing the output pulse generated by said counting circuit means on said second trigger means causing said second trigger means to assume its first operative state, circuit means for impressing horizontal synchronizing signals on said second trigger means causing said second trigger means to assume its second operative state, and means operative by said second trigger means for terminating the illumination of said cathode ray tube screen and for terminating operation of said counting circuit means.

11. An apparatus for recording received television images in which the images displayed on a cathode ray tube screen are projected on a sensitized film strip comprising, a camera including an intermittent mechanism periodically advancing and positioning said film strip, a multivibrator having two alternate conditions of operation in response to signals impressed thereon, a circuit interconnecting the output of said multivibrator and a control electrode of said cathode ray tube whereby in one condition of operation of said multivibrator said cathode ray tube screen is illuminated and in the other condition of operation of said multivibrator said screen is darkened, a counting circuit operative in accordance with successive received horizontal synchronizing signals to count such number of said signals as constitute one less than are incorporated in one complete television picture and producing an output pulse at the termination of such count, means operative by said multivibrator in its one condition of operation for initiating the operation of said counting circuit and for preventing operation of said counting circuit in its other condition of operation, a signal generator operated by said intermittent mechanism generating a signal immediately succeeding the operation of said intermittent mechanism in advancing said film strip, means operative by said generator signal and a horizontal synchronizing signal received subsequent to the production of said generator signal for causing said multivibrator to assume its one condition of operation and trigger means conditioned for operation by said counting circuit output pulse and operated by the next succeeding horizontal synchronizing signal for causing said multivibrator to assume its other condition of operation.

12. An apparatus for recording received television images in which the images displayed on a cathode ray tube screen are projected on a sensitized film strip comprising, a camera including an intermittent mechanism periodically advancing and positioning said film strip, a multivibrator having two alternate conditions of operation in response to signals impressed thereon, a circuit interconnecting the output of said multivibrator and a control electrode of said cathode ray tube whereby in one condition of operation of said multivibrator said cathode ray tube screen is illuminated and in the other condition of operation of said multivibrator said screen is darkened, a counting circuit operative in accordance with successive received horizontal synchronizing signals to count such number of said signals as constitute one less than are incorporated in one complete television picture and producing an output pulse at the termination of such count, means operative by said multivibrator in its one condition of operation for initiating the operation of said counting circuit and for preventing operation of said counting circuit in its other condition of operation, a signal generator operated by said intermittent mechanism generating a signal immediately succeeding the operation of said intermittent mechanism in advancing said film strip, means operative by said generator signal and a horizontal synchronizing signal received subsequent to the production of said generator signal for causing said multivibrator to assume its one condition of operation, trigger means having first and second operative states, said first operative state acting to condition said trigger means for operation to its second state and operation to said second state thereafter resulting in the generation of a signal pulse, circuit means impressing the output pulse of said counting circuit on said trigger means causing said trigger means to assume its first operative state, circuit means for impressing horizontal synchronizing signals on said trigger means causing said trigger means to assume its second operative state and circuit means impressing said trigger means signal pulse on said multivibrator and for causing said multivibrator to assume its said other condition of operation.

13. An apparatus for recording received television images in which the images displayed on a cathode ray tube screen are projected on a sensitized film strip comprising, a camera including an intermittent mechanism periodically advancing and positioning said film strip, a multivibrator having two alternate conditions of operation in response to signals impressed thereon, a circuit interconnecting the output of said multivibrator and a control electrode of said cathode ray tube whereby in one condition of operation of said multivibrator said cathode ray tube screen is illuminated and in the other condition of operation of said multivibrator said screen is darkened, a counting circuit operative in accordance with successive received horizontal synchronizing signals to count such number of said synchronizing signals as constitute one less than are incorporated in one complete television picture and producing an output pulse at the termination of such count, means operative by said multivibrator in said one condition of operation for initiating the operation of said counting circuit and for locking said counting circuit in a selected condition in said other condition of operation, a signal generator operated by said intermittent mechanism generating a signal immediately succeeding the operation of said intermittent mechanism in advancing said film strip, a first trigger means having first and second states of operation, said first operative state acting to condition said trigger means for operation to its second state and operation to said second state thereafter resulting in the generation of a signal pulse, circuit means impressing the signal generator signal on said first trigger means causing said trigger means to assume its first operative state, circuit means for impressing horizontal synchronizing signals on said first trigger means causing said trigger means to assume its second operative state, circuit means for causing said multivibrator to assume its said one condition of operation in response to the signal pulse generated by said first trigger means, and second trigger means conditioned for operation by the output pulse generated by said counting circuit and operated by the next succeeding horizontal synchronizing signal for causing said multivibrator to assume its said other condition of operation.

14. An apparatus for recording received television images in which the images displayed on a cathode ray tube screen are projected on a sensitized film strip comprising, a camera including an intermittent mechanism periodically advancing and positioning said film strip, a multivibrator having two alternate conditions of operation in response to signals impressed thereon, a circuit interconnecting the output of said multivibrator and a control electrode of said cathode ray tube whereby in one condition of operation of said multivibrator said cathode ray tube screen is illuminated and in the other condition of operation of said multivibrator said screen is darkened, a counting circuit operative in accordance with successive received horizontal synchronizing signals to count such number of said synchronizing signals as constitute one less than are incorporated in one complete television picture and producing an output pulse at the termination of such count, means operative by said multivibrator in said one condition of operation for initiating the operation of said counting circuit and for locking said counting circuit in a selected condition in said other condition of operation, a signal generator operated by said intermittent mechanism generating a signal immediately succeeding the operation of said intermittent mechanism in advancing said film strip, a first trigger means having first and second states of operation, said first operative state acting to condition said trigger means for operation to its second state and operation to said second state thereafter resulting in the generation of a signal pulse, circuit means impressing the signal generator signal on said first trigger means causing said trigger means to assume its first operative state, circuit means for impressing horizontal synchronizing signals on said first trigger means causing said trigger means to assume its second operative state, circuit means for causing said multivibrator to assume its said one condition of operation in response to the signal pulse generated by said first trigger means, second trigger means having first and second operative states, said first operative state acting to condition said second trigger means for operation to its second state and operation to said second state thereafter resulting in the generation of a signal pulse, circuit means impressing the output pulse generated by said counting circuit on said second trigger means causing said second trigger means to assume its first operative state, circuit means for impressing horizontal synchronizing signals on said second trigger means causing said second trigger means to assume its second operative state and circuit means impressing the signal pulse generated by said second trigger means in switching from its first to its second operative states on said multivibrator and for causing said multivibrator to assume its said other condition of operation.

15. An apparatus for recording received television images in which the images displayed on a cathode ray tube screen are projected on a sensitized film strip comprising, a camera including an intermittent mechanism periodically advancing and positioning said film strip, a multivibrator having two alternate conditions of operation in response to signals impressed thereon, a circuit interconnecting the output of said multivibrator and a control electrode of said cathode ray tube whereby in one condition of operation of said multivibrator said cathode ray tube screen is illuminated and in the other condition of operation of said multivibrator said screen is darkened, a counting circuit operative in accordance with successive received horizontal synchronizing signals to count such number of said synchronizing signals as constitute one less than are incorporated in one complete television picture and producing an output pulse at the termination of such count, means operative by said multivibrator in said one condition of operation for initiating the operation of said counting circuit and for locking said counting circuit in a selected condition in said other condition of operation, a signal generator operated by said intermittent mechanism generating a signal immediately succeeding the operation of said intermittent mechanism in advancing said film strip, a first trigger means having first and second states of operation, said first operative state acting to condition said trigger means for operation to its second state and operation to said second state thereafter resulting in the generation of a signal pulse, circuit means impressing the signal generator signal on said first trigger means causing said first trigger means to assume its first operative state, circuit means for impressing horizontal synchronizing signals on said first trigger means causing said first trigger means to assume its second operative state, a second trigger means having first and second operative states, said first operative state acting to condition said trigger means for operation to its second state and operation to said second state thereafter resulting in the generation of a signal pulse, circuit means impressing the signal pulse generated by said first trigger means on said second trigger means causing said second trigger means to assume its first operative state, circuit means for impressing horizontal synchronizing signals on said second trigger means causing said second trigger means to assume its second operative state, circuit means for causing said multivibrator to assume its said one condition of operation in response to the signal pulse generated by said second trigger means, third trigger means having first and second operative states, said first operative state acting to condition said third trigger means for operation to its second state and operation to said second state thereafter resulting in the generation of a signal pulse, circuit means impressing the output pulse generated by said counting circuit on said third trigger means causing said third trigger means to assume its first operative state, circuit means for impressing horizontal synchronizing signals on said third trigger means causing said third trigger means to assume its second operative state and circuit means impressing the signal pulse generated by said third trigger means in switching from its first to its second operative states on said multivibrator and for causing said multivibrator to assume its said other condition of operation.

FRANK N. GILLETTE.

References Cited in the file of this patent

UNITED STATES PATENTS

| Number | Name | Date |
|---|---|---|
| 2,251,786 | Epstein | Aug. 5, 1941 |
| 2,275,898 | Goldsmith | Mar. 10, 1942 |
| 2,525,891 | Garman | Oct. 17, 1950 |
| 2,565,366 | Gray | Aug. 21, 1951 |
| 2,604,535 | Garman | July 22, 1952 |
| 2,613,264 | Haynes | Oct. 7, 1952 |